Nov. 11, 1930.  A. SAPIER  1,780,945
FILM FRAMER FOR MOTION PICTURE PROJECTORS
Filed June 13, 1929  2 Sheets-Sheet 1

Witnesses
Arthur M. Franke
Wm. E. Anderson

Inventor
Abraham Sapier
By Rummler & Rummler
Attys.

Nov. 11, 1930.  A. SAPIER  1,780,945
FILM FRAMER FOR MOTION PICTURE PROJECTORS
Filed June 13, 1929  2 Sheets-Sheet 2
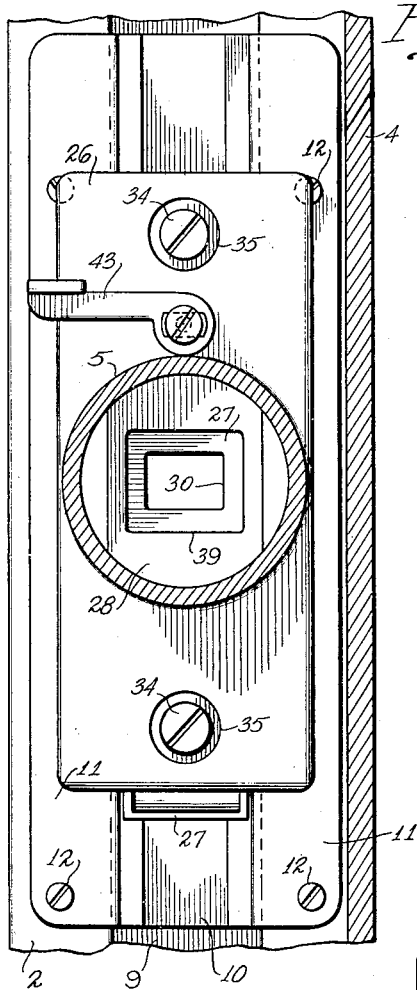
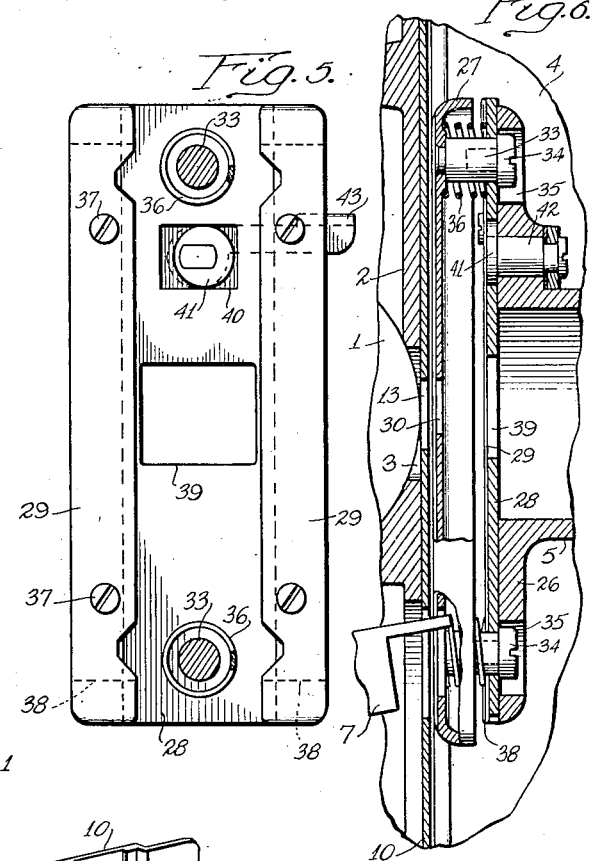
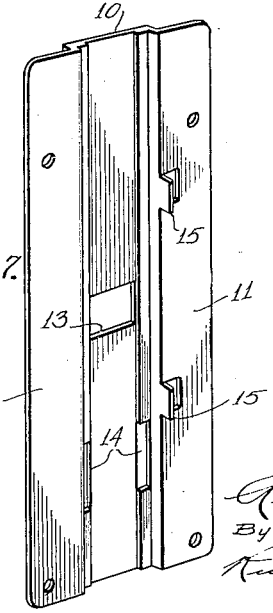

Patented Nov. 11, 1930

1,780,945

UNITED STATES PATENT OFFICE

ABRAHAM SAPIER, OF CHICAGO, ILLINOIS, ASSIGNOR TO UNIVERSAL STAMPING & MFG. CO., OF CHICAGO, ILLINOIS, A CORPORATION OF ILLINOIS

FILM FRAMER FOR MOTION-PICTURE PROJECTORS

Application filed June 13, 1929. Serial No. 370,522.

The main objects of this invention are to provide a motion picture projecting machine having an improved framer for framing the film; to provide a film framer having improved tensioning means for tensioning that portion of the film traversing the path of light; to provide improved means for adjustably supporting the framer and tensioning means; and to provide improved means for shifting the framer and tensioning means transversely of the path of light.

An illustrative embodiment of this invention is shown in the accompanying drawings, wherein:

Fig. 4 is a vertical section, taken on the line 4—4 of Fig. 1.

Fig. 5 is a vertical section, taken on the line 5—5 of Fig. 1.

Fig. 6 is a fragmentary vertical section similar to Fig. 1, but showing the film framer in an elevated position for raising the picture in the light field on the screen.

Fig. 7 is a perspective of the film guide plate.

Figure 1:
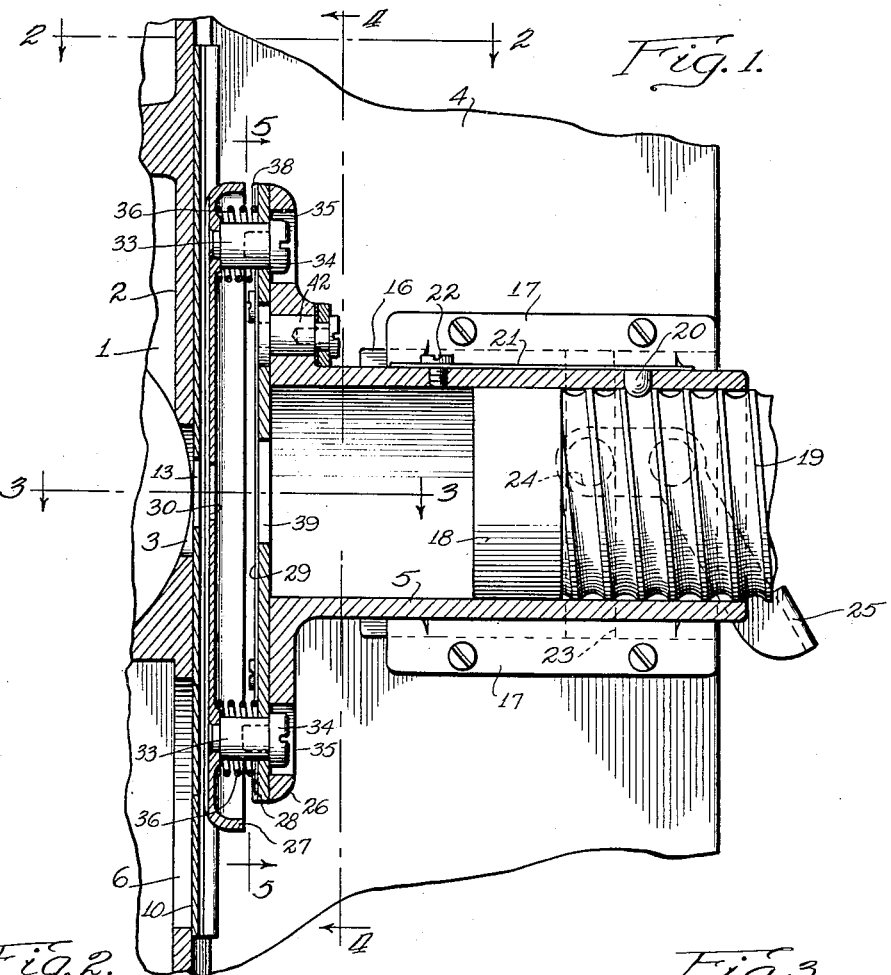
Figure 1 is a fragmentary vertical section of the front part of a motion picture projecting machine to which an improved framer is applied.
Figure 2:
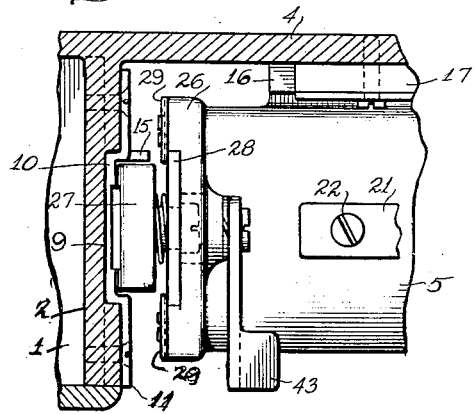
Fig. 2 is a horizontal section, taken on the line 2—2 of Fig. 1 and showing the film framer in operative position.
Figure 3:
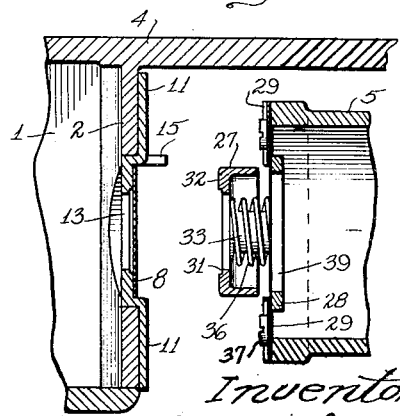
Fig. 3 is a horizontal section, taken on the line 3—3 of Fig. 1 and showing the film framer and its support in a retracted position to permit insertion and removal of the film.

The improved framing device to which this invention is applied may be used in connection with motion picture projecting machines of the type disclosed in my co-pending applications Serial No. 369,126, filed June 7, 1929, and Serial No. 374,630, filed June 29, 1929.

Inasmuch as this invention relates particularly to the means for framing the film, the accompanying drawings show only as much of the entire projector as will be of assistance in apprehending the invention.

Motion picture projecting machines generally include an upright casing having a rear compartment for housing the usual light bulb and a forward compartment in which is mounted a rotatable light interceptor arranged directly behind a light aperture in the film guideway. The film is fed rapidly through the guideway by suitable feeding means for momentarily positioning each picture directly in front of the light aperture. The projector casing is generally adjustable relative to its base so as to permit the light field to be accurately positioned on the receiving screen.

In addition to accurately positioning the light field on the receiving screen, it is necessary to project each picture onto the screen within the border of the light field. For this reason, most projecting machines are equipped with a framing device for properly framing the film.

In the form shown, the improved framing device is adjustably supported on the casing directly in front of the light aperture of the stencil guideway and it is shiftable horizontally and vertically.

In the construction illustrated, the casing of the machine, which is only partly shown, includes a compartment 1 having a front wall 2 provided with a central aperture 3 and a side wall 4, which extends forwardly beyond the light aperture for supporting an axially adjustable lens mounting 5.

The compartment 1 houses the light interceptor, not shown, which interrupts the rays of light which are projected forwardly through the aperture 3 from a lamp located in a compartment behind the interceptor, as illustrated in said co-pending application Serial No. 369,126.

Formed in the front wall 2, below the light aperture, is an opening 6 for accommodating a feeding claw 7 projecting forwardly for engagement with a film 8 to feed the film downwardly in front of the light aperture. The film 8 is supported by the usual reels, not shown.

Formed in the front wall 2, is a vertically disposed recess 9 in which is seated a film guide 10 having a pair of flanges 11 secured to the front wall by screws 12 or other suitable fastening means. Formed in the guide 10, is a light aperture 13 which registers with the aperture 3. Located below the aperture 13 is a pair of slots 14 registering with the opening 6 for accommodating the two prongs of the feeding claw 7. Struck out from one of the flanges 11, is a pair of lugs 15 forming stops for guiding the film into proper position when it is inserted into the guideway.

In the construction illustrated, the lens mounting 5 comprises a cylindrical shell having a pair of flanges 16, which are slidable in a pair of horizontal rails 17 secured to the wall 4.

Rotatably mounted in the shell 5 is a ferrule 18 which supports the lens, not shown, and which is provided with an external thread 19, engaging a yielding shoulder 20 extending inwardly through the top wall of the shell 5. The shoulder 20 is mounted on a spring 21 secured at one end to the shell 5 by a screw 22, so as to permit the shoulder 20 to be retracted when the lens is roughly adjusted by an axial movement of the ferrule 18. A fine adjustment of the lens is obtained by rotating the ferrule.

Formed in one side of the mounting 5, is a vertical recess 23 for receiving a pin 24 mounted on one end of a bell crank lever 25 which is pivotally secured to the casing wall 4 for axially shifting the mounting 5 to permit insertion and removal of the film. Formed on the inner end of the lens mounting 5, is a vertical flange 26, which supports the improved film framing device to which this invention is applied.

In the form shown, the improved framing device comprises a shoe 27 supported on a plate 28 which is slidably secured to the flange 26 by guide rails 29. The shoe 27 has a framing aperture 30 which is adapted to be shifted vertically relative to the aperture 3 by the vertical movement of the plate 28. The edges of the shoe 27 are rounded so as not to injure the film.

Formed in the outer face of the shoe 27, is a recess 31 to prevent the shoe from contacting with the body of the film. Located on opposite sides of the recess 31, are bearing surfaces 32 adapted to frictionally engage the perforated margins of the film for tensioning the film while it travels across the light aperture.

Rigidly secured to the shoe 27, is a pair of studs 33 extending through the supporting plate 28, and provided with removable heads 34 located in openings 35 formed in the flange 26. Embracing the studs 33, are springs 36, which yieldingly urge the shoe 27 into frictional contact with the film.

In the form shown, the guide rails 29 are secured to the flange 26 by screws 37, which press the central portions of the rails into frictional contact with the plate 28. The ends of the rails 29 are doubled inwardly upon themselves, as shown at 38.

The plate 28 has a central opening 39 registering with the apertures 13 and 30. Formed in the plate 28 above the opening 39, is an opening 40, in which is seated an eccentric 41 mounted on a pin 42 which is rotatably supported on the flange 26. Mounted on the outer end of the pin 42, is a handle 43, by which the eccentric may be rotated for shifting the framing unit vertically to adjust the aperture 30 relative to the aperture 13.

In operation, to insert a film, the handle 25 is raised so as to retract the mounting 5 and the shoe 27. After the film has been inserted into the guideway 10, the handle 25 is depressed for urging the shoe 27 into contact with the film. The film is fed downward in the usual manner for momentarily positioning each picture between the apertures 13 and 30. In the event that the pictures are not properly framed in the light field on the screen, the shoe 27 is shifted vertically by means of the handle 43 for adjusting the framing aperture 30 relative to the light aperture 13.

Although but one specific embodiment of this invention has been herein shown and described, it will be understood that numerous details of the construction shown may be altered or omitted without departing from the spirit of this invention as defined by the following claims.

I claim:

1. A picture projecting machine comprising a casing having a vertical film guideway provided with a light aperture, a lens mounting adjustably supported on said casing in front of said aperture, a film framer supported on said lens mounting, a pin rotatable on said lens mounting, a handle on one end of said pin, and an eccentric mounted on the other end of said pin and engaging said framer for shifting said framer vertically relative to said aperture.

2. A picture projecting machine comprising a casing having a vertical film guideway provided with a light aperture, said casing having a side wall extending forwardly of said guideway and disposed in a plane substantially normal to the plane of said guideway, tracks on said side wall, a lens mounting slidably supported on said tracks in front of said aperture, a film framer supported on said lens mounting, said lens mounting being movable axially in a straight line movement toward and from said guideway, for shifting said framer toward and from said aperture while maintaining said framer substantially parallel to said guideway, and an eccentric supported on said mounting and engaging said framer for shifting said framer vertically relative to said aperture.

3. A picture projecting machine comprising a casing having a vertical film guideway provided with a light aperture, a lens mounting supported on said casing in front of said aperture, a plate adjustably supported on said mounting, a film framing member supported on said plate, means yieldably urging said member toward said guideway for frictional contact with the film, and means on said lens mounting coacting with said plate for shifting said framing member vertically.

4. A picture projecting machine comprising a casing having a vertical film guideway provided with a light aperture, a lens mounting supported on said casing in front of said aperture, a vertically adjustable plate supported on said mounting, a film tensioning member mounted on said plate and having a framing aperture, springs urging said tensioning member toward said guideway for frictional contact with the film, and means on said casing coacting with said plate for shifting said tensioning member vertically.

5. A motion picture projector comprising a casing having a vertical film guideway provided with a light aperture, a lens mounting adjustably supported on said casing in front of said aperture, a vertically adjustable plate supported on said mounting, a pair of guide rails secured to said mounting and frictionally engaging said plate, a pair of studs supported on said plate, a film tensioning member supported on said studs, springs embracing said studs and urging said member toward said guideway for frictional contact with the film, said tensioning member having a film framing aperture, and an eccentric supported on said lens mounting and engaging said plate for shifting said tensioning member and framing aperture vertically relative to said light aperture.

Signed at Chicago this 10th day of June, 1929.

ABRAHAM SAPIER.